United States Patent
Pareek et al.

(10) Patent No.: US 10,747,502 B2
(45) Date of Patent: Aug. 18, 2020

(54) MULTIPLY AND ACCUMULATE CIRCUIT

(71) Applicant: Xilinx, Inc., San Jose, CA (US)

(72) Inventors: Satyaprakash Pareek, Campbell, CA (US); Anup Hosangadi, San Jose, CA (US); Bing Tian, San Jose, CA (US); Ashish Sirasao, San Jose, CA (US); Yao Fu, Castro Valley, CA (US); Oscar Fernando C. Fernandez, Ithaca, NY (US); Michael Wu, Palo Alto, CA (US); Christopher H. Dick, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 58 days.

(21) Appl. No.: 16/136,041

(22) Filed: Sep. 19, 2018

(65) Prior Publication Data

US 2020/0089472 A1 Mar. 19, 2020

(51) Int. Cl.
*G06F 7/544* (2006.01)
*G06F 7/499* (2006.01)
*G06F 9/30* (2018.01)
*G06F 9/38* (2018.01)

(52) U.S. Cl.
CPC ........ *G06F 7/49915* (2013.01); *G06F 7/5443* (2013.01); *G06F 9/3001* (2013.01); *G06F 9/3887* (2013.01)

(58) Field of Classification Search
USPC ........................................ 708/204, 503, 523
See application file for complete search history.

(56) References Cited

U.S. PATENT DOCUMENTS

| 4,615,013 A * | 9/1986 | Yan .......................... G06T 15/04 345/427 |
| 4,622,650 A * | 11/1986 | Kulisch ................... G06F 7/483 708/603 |
| 4,991,131 A | 2/1991 | Yeh et al. |
| 2009/0154334 A1 | 6/2009 | Lee et al. |

OTHER PUBLICATIONS

Drummond, Mario, "End-to-End DNN Training with Block Floating Point Arithmetic," Apr. 4, 2018, pp. 1-10, arXiv.org > cs > arXiv:1804.01526v1.
Burger, Doug, "Microsoft unveils Project Brainwave for real-time AI," Aug. 22, 2017, pp. 1-4, Microsoft Corp., Redmond, Washington, USA.
Canziani, Alfredo et al., "An Analysis of Deep Neural Network Models for Practical Applications," May 24, 2016, pp. 1-7, Cornell University Library, arXiv.org > cs > arXiv:1605.07678.

(Continued)

*Primary Examiner* — Tan V Mai
(74) *Attorney, Agent, or Firm* — Crawford Maunu PLLC (57) ABSTRACT

Circuits and method for multiplying floating point operands. An exponent adder circuit sums a first exponent and a second exponent and generates an output exponent. A mantissa multiplier circuit multiplies a first mantissa and a second mantissa and generates an output mantissa. A first conversion circuit converts the output exponent and output mantissa into a fixed point number. An accumulator circuit sums contents of an accumulation register and the fixed point number into an accumulated value and stores the accumulated value in the accumulation register.

18 Claims, 8 Drawing Sheets

(56) References Cited

OTHER PUBLICATIONS

Chung, Eric et al., "Accelerating Persistent Neural Networks at Datacenter Scale," presentation at Hot Chips 2017, Aug. 20, 2017, pp. 1-52, www.hotchips.org.

Dettmers, Tim, "8-Bit Approximations for Parallelism in Deep Learning," Nov. 14, 2015, pp. 1-14, Cornell University Library, arXiv.org > cs > arXiv:1511.04561.

Ercegovac, Milos D., "On Approximate Arithmetic," Proc. of the 2013 Asilomar Conference on Signals, Sytems, and Computers, Nov. 3, 2013, pp. 1-5, IEEE, Piscataway, New Jersey, USA.

Gudovskiy, Luca Rigazio, "ShiftCNN: Generalized Low-Precision Architecture for Inference of Convolutional Neural Networks," Jun. 7, 2017, pp. 1-9, Cornell University Library, arXiv.org > cs > arXiv:1706.02393.

Gysel, Philipp et al., "Hardware-Oriented Approximation of Convolutional Neural Networks," Apr. 11, 2016, pp. 1-8, Cornell University Library, arXiv.org > cs > arXiv:1604.03168.

Han, Song et al., "Deep Compression: Compressing Deep Neura Networks with Pruning, Trained Quantization and Huffman Coding," Oct. 1, 2015, pp. 1-14, Cornell University Library, arXiv.org > cs > arXiv:1510.00149.

Horowitz, Mark, "Computing's Energy Problem (and what we can do about it)," 2014 International Solid-State Circuits Conference Digest of Technical Papers, Feb. 9, 2014, pp. 10-14, IEEE, Piscataway, New Jersey, USA.

Hubara, Itay et al., "Quantized Neural Networks: Training Neural Networks with Low Precision Weights and Activations," Sep. 22, 2016, pp. 1-29, Cornell University Library, arXiv.org > cs > arXiv:1609.07061.

Zhou, Aojun et al., "Incremental Network Quantization: Towards Lossless CNNs with Low-Precision Weights," Feb. 10, 2017, pp. 1-14, Cornell University Library, arXiv.org > cs > arXiv:1702.03044.

\* cited by examiner

MULTIPLY AND ACCUMULATE CIRCUIT

TECHNICAL FIELD

The disclosure generally relates to multiply and accumulate (MAC) circuitry.

BACKGROUND

Neural networks are computationally intensive applications. Some large scale neural networks, such as the VGG-16 convolutional neural network (CNN), require 30 Gflops to perform image classification of a single image. A large portion of the computation is devoted to multiply and accumulate operations. Multiply and accumulate operations are used in computing dot products and scalar products, for example.

Hardware accelerators have been used to reduce the computation time. Example hardware accelerators include application-specific integrated circuits (ASICs), filed programmable gate arrays (FPGAs), and special purpose processors such as graphics processing units (GPUs). Though the performance improvement provided by hardware accelerators is considerable, so too is the increase in power consumption and data bandwidth requirements. Weights and input activations are often stored as 32-bit single precision floating point values, and the hardware accelerators perform MAC operations on 32-bit operands.

A number of approaches have been proposed for reducing the computational requirements of neural networks. In some approaches, the number of bits used to represent the weights and input activations is reduced, which reduces both computational and bandwidth requirements. However, these approaches may require layer-specific architectures and/or specific training procedure. Some prior approaches may also perform poorly in complex classification tasks.

SUMMARY

A disclosed circuit arrangement includes an exponent adder circuit configured to sum a first exponent and a second exponent and generate an output exponent. A mantissa multiplier circuit is configured to multiply a first mantissa and a second mantissa and generate an output mantissa. A first conversion circuit is coupled to outputs of the exponent adder circuit and the mantissa multiplier circuit. The conversion circuit is configured to convert the output exponent and output mantissa into a fixed point number. The circuit arrangement further includes an accumulation register and an accumulator circuit. The accumulator circuit is coupled to the conversion circuit and to the accumulation register. The accumulator circuit is configured to sum contents of the accumulation register and the fixed point number into an accumulated value and store the accumulated value in the accumulation register.

A disclosed method includes storing a first shared exponent and a second shared exponent in first and second shared exponent registers, respectively. The method sums a first exponent and a second exponent and generates an output exponent. The method further multiplies a first mantissa and a second mantissa and generates an output mantissa. The contents of an accumulation register and a value based on the output exponent and output mantissa are summed into an accumulated value. The accumulated value is stored in the accumulation register, and an exponent of the accumulated value is updated to an expanded exponent based on the first shared exponent, second shared exponent, and the exponent of the accumulated value.

Other features will be recognized from consideration of the Detailed Description and Claims, which follow.

BRIEF DESCRIPTION OF THE DRAWINGS

Various aspects and features of the circuits and methods will become apparent upon review of the following detailed description and upon reference to the drawings in which.

DETAILED DESCRIPTION

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed approaches perform low-precision operations without requiring special training or modifications to the network architecture. The small bit-width computations can be achieved by way of combinations of features such as a MAC circuit that performs floating point multiplications and fixed point additions, and/or quantization of the floating point input values to the MAC circuit. In one approach to reducing the bit-width of operands in a MAC circuit, multiplication operations are performed using floating point multiplication, and additions are performed using fixed point addition. In the floating point representation of the operands, the exponent is biased by an amount that makes the exponent always positive. For example, in a floating point representation, 1 bit represents the sign, NE=the number of bits representing the exponent, and NM=the number of bits representing the mantissa, and the exponent is biased by $2^{NE-1}-1$. This format implies a hidden bit such that each floating point number has a value equal to $(-1)^{S}*(1.M* 2^{E-bias})$, where S is the value of the sign, E is the value of the exponent, and M is the value of the mantissa.

In another feature, the bit-width of the floating point operands is reduced by quantizing the operands. Shared exponents are factored-out from operands that can include a set of weights and input activations, for example. Generating shared exponents for the weights and input activations can reduce the number of bits used to represent the operands to 1 sign bit, 3 exponent bits, and 3 mantissa bits, for example. The multiplier in a MAC circuit can thereby be reduced to a small bit-width multiplier. Alternatively, a large bit-width multiplier can be used to perform several small bit-width multiplications at once. Multipliers can be inexpensively implemented by lookup tables in field programmable gate arrays (FPGAs), for example. Accumulation within the MAC circuit can be performed using either floating point values or fixed point operations.

Figure 1:
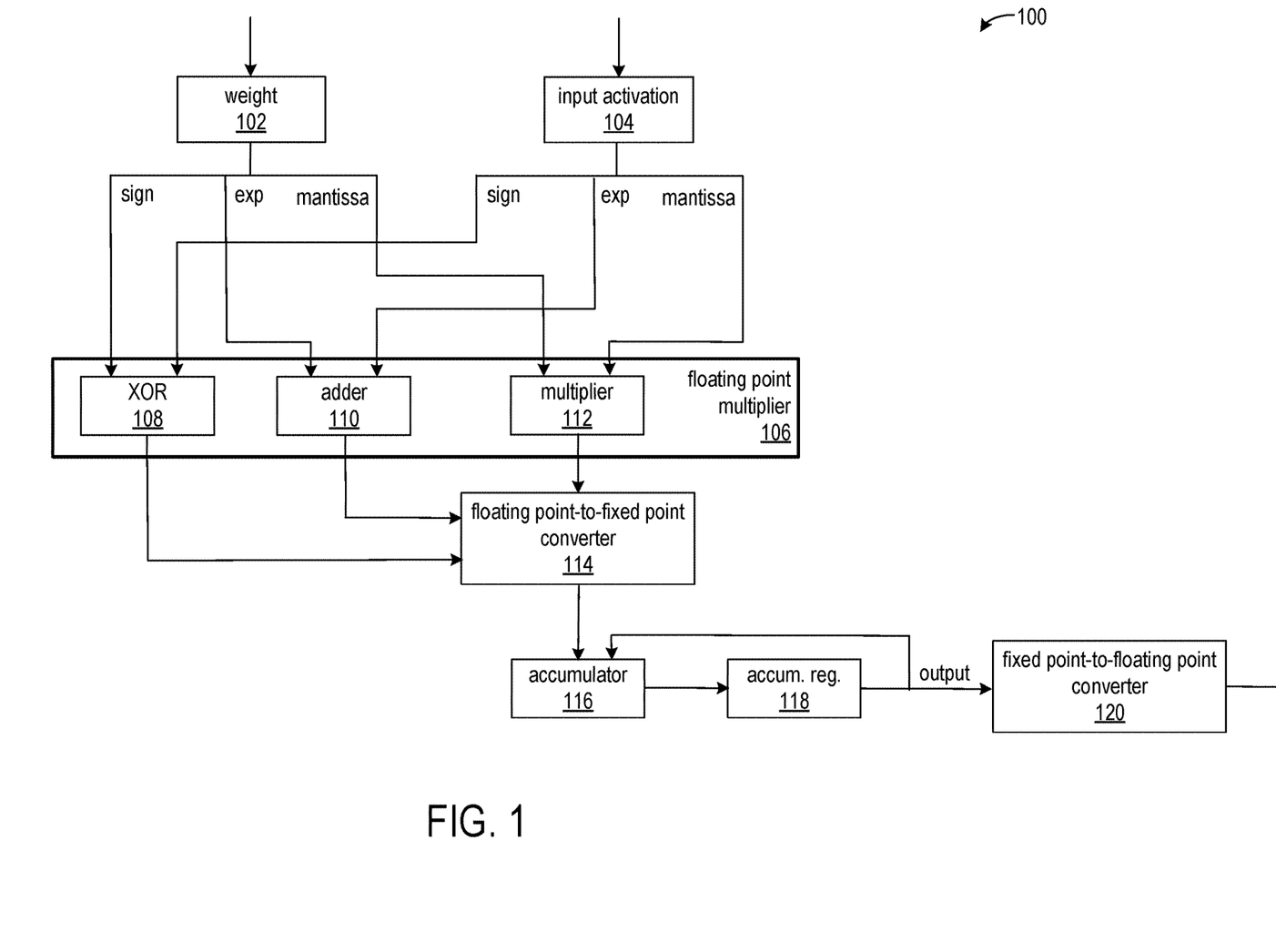
FIG. 1 shows a MAC circuit in which the multiplier operates on floating point values, and the accumulator operates on fixed point values.

FIG. 1 shows a MAC circuit 100 in which the multiplier operates on floating point values, and the accumulator operates on fixed point values. To overcome limitations associated with pipelining and the large number of logic levels in a floating point adder implementation, in one approach multiplication is performed using a floating point multiplier, the output of multiplier is converted to a fixed point value, and accumulation is performed using fixed point addition with an option of converting final result back to the desired format.

In an exemplary application, the MAC circuit 100 can be one instance of a MAC circuit in an array (not shown) of MAC circuits that is used in a neural network. An input floating point weight value is provided in register 102, and an input floating point input activation value is provided in register 104. The weight value and input activation value are input to the floating point multiplier circuit 106, which includes an XOR circuit 108, an adder circuit 110, and a multiplier circuit 112.

One bit of each floating point value indicates the sign ("sign bit"), one set of bits represent the exponent ("exponent bits"), and another set of bits represent the mantissa ("mantissa bits"). The sign bits of the weight operand and input activation operand are input to the XOR circuit 108, the exponent bits are input to the adder circuit 110, and the mantissa bits are input to the multiplier circuit 112.

The floating point-to-fixed point conversion circuit 114 inputs the output sign bit from the XOR circuit 108, the resulting exponent from the adder circuit 110, and the product from the multiplier circuit 112. The conversion circuit converts the floating point value, as represented by the sign bit, exponent bits, and mantissa bits output by the floating point multiplier, into a fixed point value. The accumulator circuit 116 adds the fixed point value from the conversion circuit 114 to the accumulated value stored in the register 118, and then updates the accumulation register with the new value.

In an exemplary application, once a set of weight values and input activation values have been multiplied and accumulated, the fixed point-to-floating point conversion circuit 120 can be enabled to read the result from the accumulation register 118 and convert the fixed point value to a floating point value. The output value can be an input value to a next layer in a neural network, for example.

Figure 2:
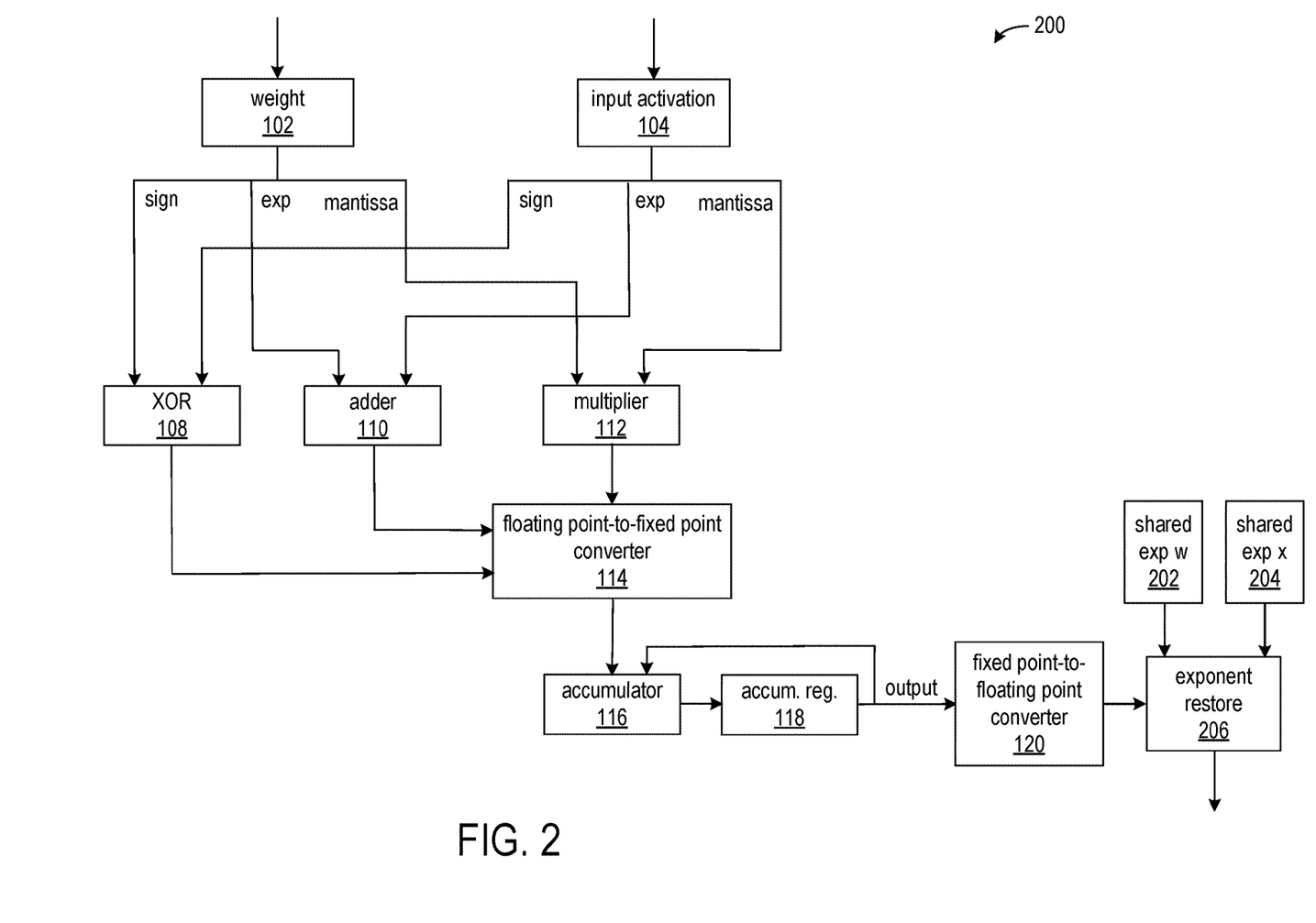
FIG. 2 shows a MAC circuit that operates on input operands in which the bit-widths have been reduced by factoring-out shared exponents from the floating point weight values and input activation values.

FIG. 2 shows a MAC circuit 200 that operates on input operands in which the bit-widths have been reduced by factoring-out shared exponents from the floating point weight values and input activation values. The shared exponents can be restored to the finally accumulated value.

In an exemplary application, the MAC circuit 200 can be one instance of a MAC circuit in an array (not shown) of MAC circuits that is used in a neural network. An input floating point weight value is provided in register 102, and an input floating point input activation value is provided in register 104. Each input weight value and input activation value is a quantized version of an original weight value and original input activation value on which a shared exponent has been factored-out. The shared exponent for the weight values can be stored in register 202, and the shared exponent for the input activation values can be stored in register 204. The sign bits of the weight operand and input activation operand are input to the XOR circuit 108, the exponent bits are input to the adder circuit 110, and the mantissa bits are input to the multiplier circuit 112.

Figure 5:
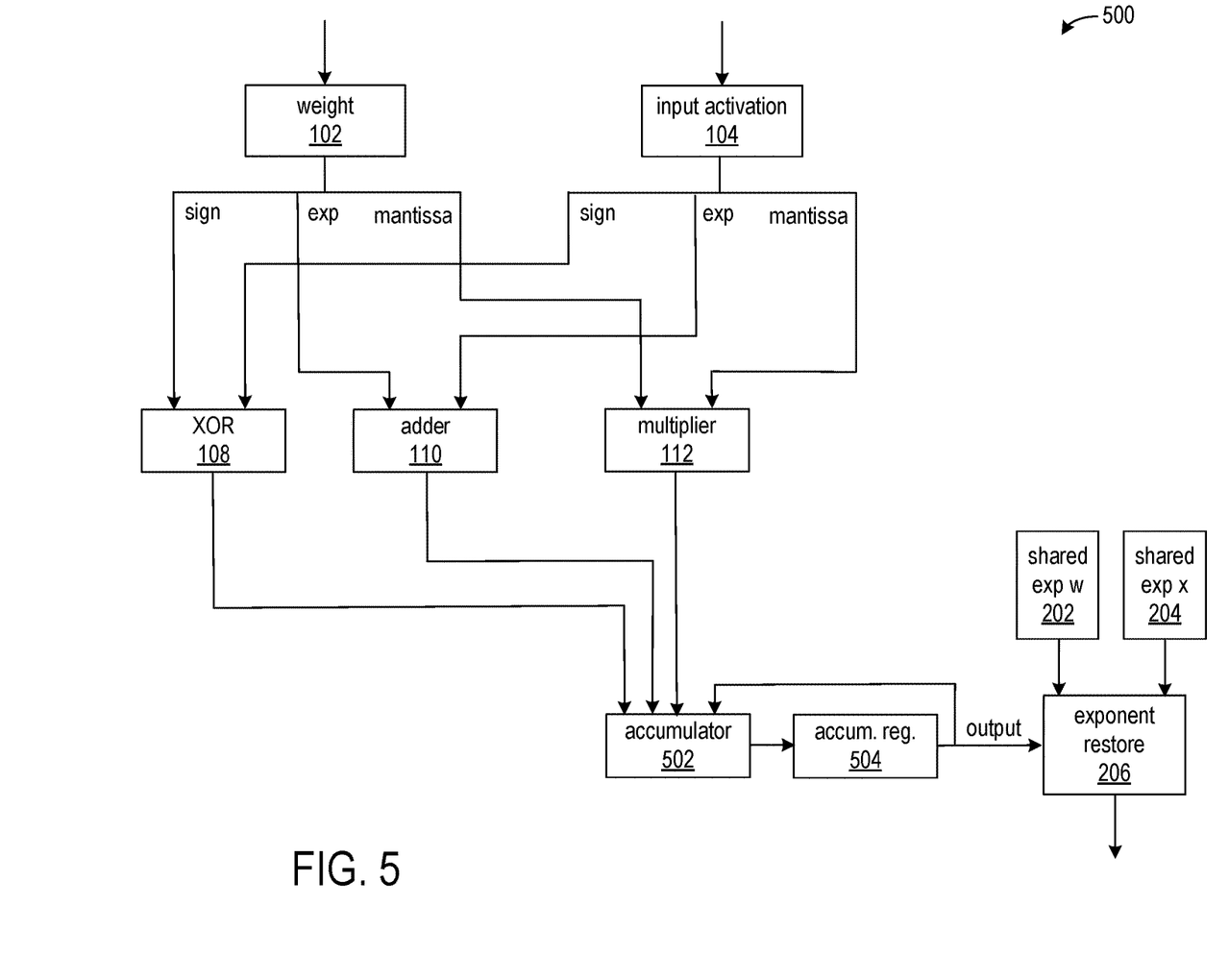
FIG. 5 shows a MAC circuit that operates on input operands in which the bit-widths have been reduced by factoring-out shared exponents from the floating point weight values and input activation values.

Either floating point accumulation or fixed point accumulation can be used to accumulate the floating point result from the XOR circuit 108, adder circuit 110, and multiplier circuit 112. The exemplary MAC circuit 200 perform fixed point accumulation and includes floating point-to-fixed point conversion circuit 114 to convert the floating point value into a fixed point value. Note that an implementation involving floating point accumulation is shown in FIG. 5.

The accumulator circuit 116 adds the fixed point value from the conversion circuit 114 to the accumulated value stored in the register 118, and then updates the accumulation register with the new value.

Once a set of weight values and input activation values have been multiplied and accumulated, the fixed point-to-floating point conversion circuit 120 can be enabled to read the result from the accumulation register 118 and convert the fixed point value to a floating point value. The exponent restoration circuit 206 inputs the floating point result value from the conversion circuit 120 and restores the exponent of the result value to include the shared exponents from the shared exponent registers 202 and 204. The output value from the exponent restoration circuit 206 can be an input value to a next layer in a neural network, for example.

Figure 3:
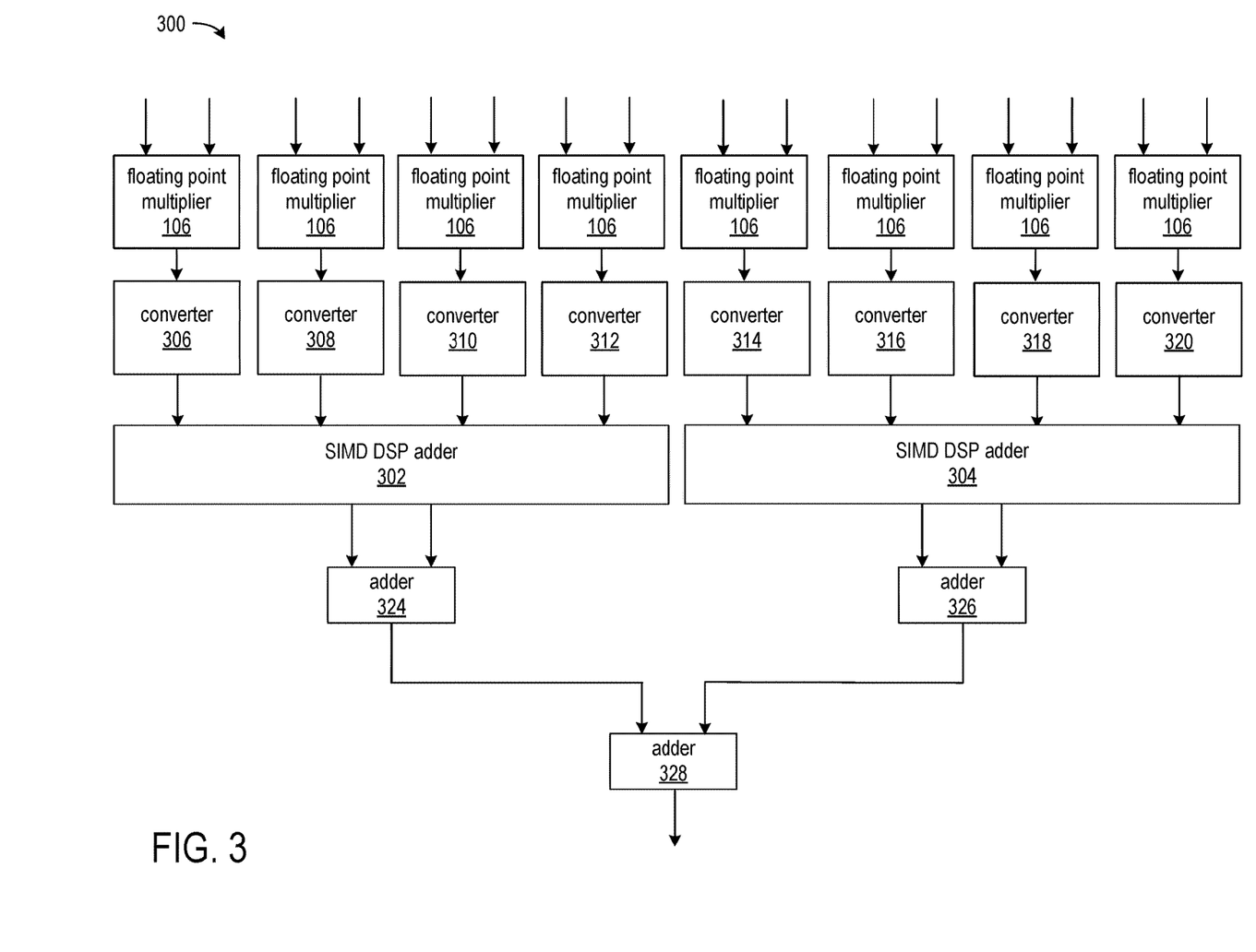
FIG. 3 shows an exemplary implementation of an array or portion of an array of MAC circuits on a target programmable integrated circuit having programmable logic circuitry that implements floating point multipliers and conversion circuits, a single instruction multiple data (SIMD) digital signal processor (DSP) circuit that implements partial accumulation, and further programmable logic circuitry that implements adder circuits.

FIG. 3 shows an exemplary implementation of an array or portion of an array of MAC circuits 300 on a target programmable integrated circuit having programmable logic circuitry that implements floating point multipliers and conversion circuits, a single instruction multiple data (SIMD) digital signal processor (DSP) circuit, and further programmable logic circuitry that implements adder circuits and accumulation.

The floating point multiplication circuits 106, conversion circuits 306, 308, 310, 312, 314, 316, 318, and 320, SIMD DSP circuits 302 and 304, and adder circuits 324, 326, and 328 can implement an array or a portion of an array of MAC circuits. The SIMD DSP circuits 302 are configurable to perform a variety of arithmetic functions on operands of different sizes. An example implementation of an SIMD DSP circuit is the DSP48E1 slice found in field programmable gate arrays (FPGAs) from XILINX®, Inc.

In the exemplary implementation of FIG. 3, each SIMD DSP circuit 302 and 304 is configured as a quad 12-bit adder. SIMD DSP circuit 302 accumulates fixed point operands from floating point-to-fixed point conversion circuits 306, 308, 310, and 312. SIMD DSP circuit 304 accumulates fixed point operands from floating point-to-fixed point conversion circuits 314, 316, 318, and 320. The SIMD DSP circuits thereby perform the accumulation function of multiple MACs in parallel. An exemplary XILINX SIMD circuit can also implement an adder in dual 24-bit mode.

In an exemplary configuration, SIMD DSP circuit 302 sums the values provided by converters 306 and 308 and in parallel sums the value provided by converters 310 and 312, producing two output values in parallel. Likewise, SIMD DSP circuit 304 sums the values provided by converters 314 and 316 and in parallel sums the value provided by converters 318 and 320, producing two output values in parallel. The two output values from SIMD DSP circuit 302 are input to adder circuit 324, which produces one value, and the two output values from SIMD DSP circuit 304 are input to adder circuit 326, which produces one value. The values output by the adder circuits are input to the adder circuit 328, which produces the final sum of the values output by the converters 306, 308, 310, 312, 314, 316, 318, and 320.

Figure 4:
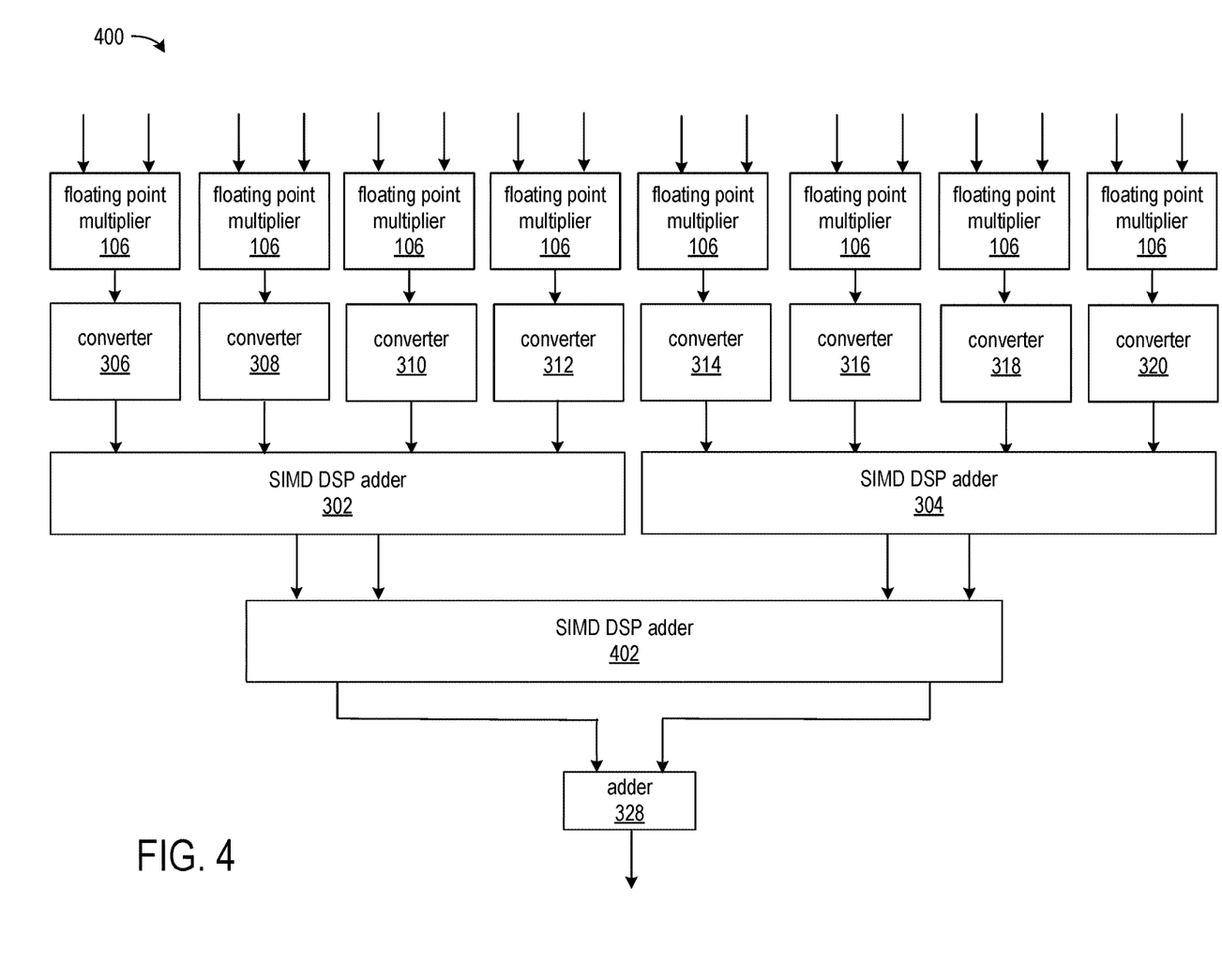
FIG. 4 shows an exemplary implementation of an array or portion of an array of MAC circuits on a target programmable integrated circuit having programmable logic circuitry that implements floating point multipliers and conversion circuits, a single instruction multiple data (SIMD) digital signal processor (DSP) circuit, and further programmable logic circuitry that implements adder circuits.

FIG. 4 shows an exemplary implementation of an array or portion of an array of MAC circuits 400 on a target programmable integrated circuit having programmable logic circuitry that implement floating point multipliers and conversion circuits, a single instruction multiple data (SIMD) digital signal processor (DSP) circuit that implements partial accumulation, and further programmable logic circuitry that implements adder circuits. Adder circuits 324 and 326 of FIG. 3 are replaced by SIMD DSP circuit 402, which is configured as a dual 24-bit adder.

In an exemplary configuration, SIMD DSP circuit 302 sums the values provided by converters 306 and 308 and in parallel sums the value provided by converters 310 and 312, producing two output values in parallel. Likewise, SIMD DSP circuit 304 sums the values provided by converters 314 and 316 and in parallel sums the value provided by converters 318 and 320, producing two output values in parallel. The two output values from SIMD DSP circuit 302 and the two output values from SIMD DSP circuit 304 are input to SIMD DSP circuit 402. SIMD DSP circuit 402 sums the two values provided by SIMD DSP circuit 302 and in parallel sums the value provided by SIMD DSP circuit 304, producing two output values in parallel. The values output by the SIMD DSP circuit 402 are input to the adder circuit 328, which produces the final sum of the values output by the converters 306, 308, 310, 312, 314, 316, 318, and 320.

FIG. 5 shows a MAC circuit 500 that operates on input operands in which the bit-widths have been reduced by factoring-out shared exponents from the floating point weight values and input activation values. The shared exponents can be restored to the finally accumulated value.

In an exemplary application, the MAC circuit 500 can be one instance of a MAC circuit in an array (not shown) of MAC circuits that is used in a neural network. An input floating point weight value is provided in register 102, and an input floating point input activation value is provided in register 104. Each input weight value and input activation value is a quantized version of an original weight value and original input activation value on which a shared exponent has been factored-out. The shared exponent for the weight values can be stored in register 202, and the shared exponent for the input activation values can be stored in register 204. The sign bits of the weight operand and input activation operand are input to the XOR circuit 108, the exponent bits are input to the adder circuit 110, and the mantissa bits are input to the multiplier circuit 112.

Accumulator circuit 502 performs floating point accumulation of the floating point value from the XOR circuit 108, adder circuit 110, and multiplier circuit 112 and the accumulated value stored in the register 504, and then updates the accumulation register with the new value.

Once a set of weight values and input activation values have been multiplied and accumulated, the exponent restoration circuit 206 can be enabled to input the floating point result value from accumulation register 504 and restore the exponent of the result value to include the shared exponents from the shared exponent registers 202 and 204. The output value from the exponent restoration circuit 206 can be an input value to a next layer in a neural network, for example.

Figure 6:
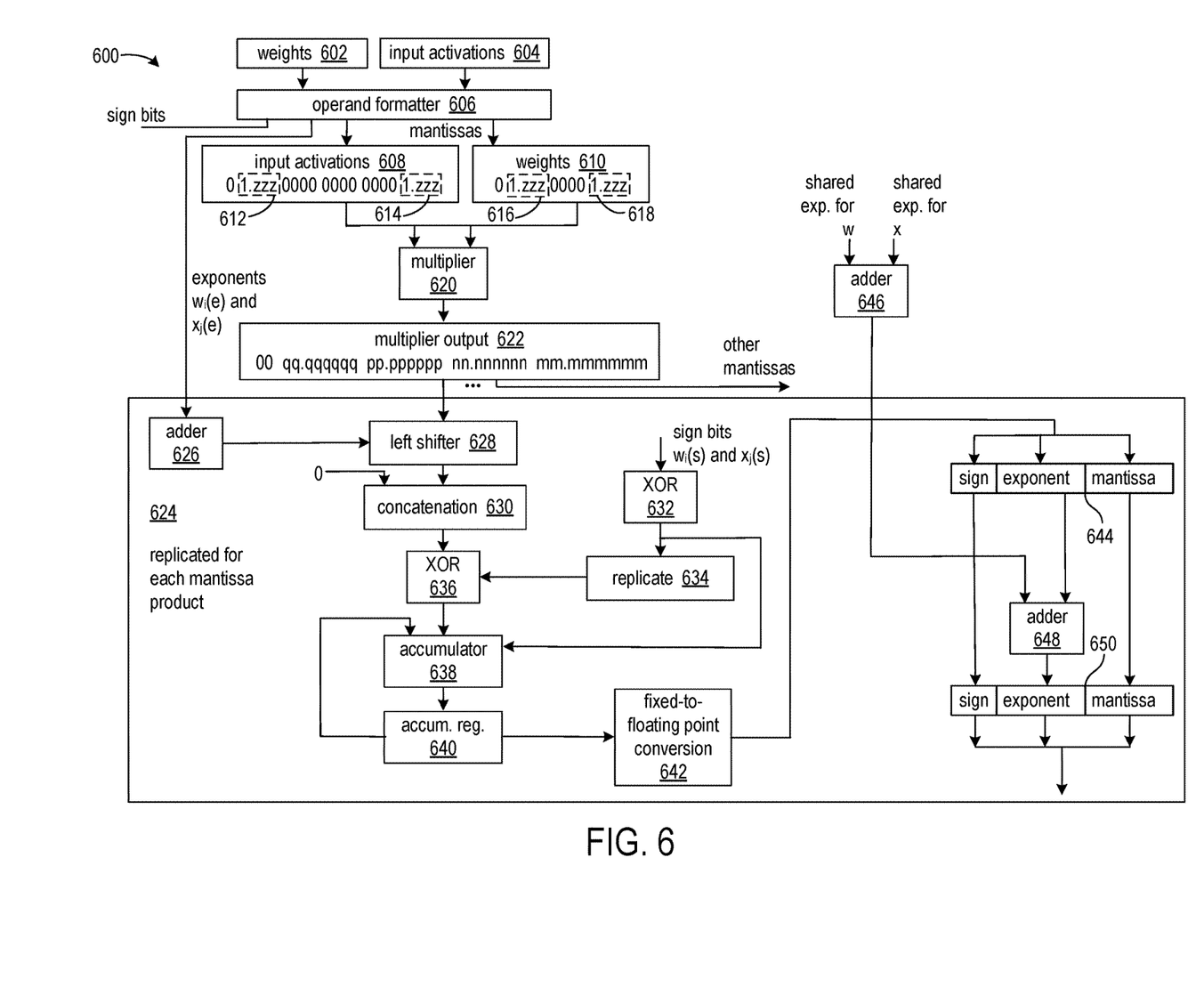
FIG. 6 shows a circuit arrangement in which a portion of the exponent has been factored out of the floating point operands in a MAC circuit, and the circuitry that multiplies mantissas is implemented as a large-bit multiplier that performs several low bit-width multiplications.

FIG. 6 shows a circuit arrangement 600 in which a portion of the exponent has been factored out of the floating point operands in a MAC circuit, and the circuitry that multiplies mantissas is implemented as a large-bit multiplier that performs several low bit-width multiplications. Storage circuit 602 stores multiple floating point multiplicands (operands), such as weights, and storage circuit 604 stores multiple floating point multipliers (operands), such as input activations. The storage circuits can be register banks or random access memories (RAMs), for example.

The operand formatting circuit 606 is configured to input the mantissas of the multiple multiplicands and combine the mantissas into a single multiplicand, which can be termed a multi-multiplicand operand. The multi-multiplicand operand is stored in the register 608. The operand formatting circuit is also configured to input the mantissas of the multiple multipliers and combine the multipliers into a single multiplier, which can be termed a multi-multiplier operand. The multi-multiplier operand is stored in the register 610.

An exemplary multi-multiplicand operand and multi-multiplier operand are shown in registers 608 and 610, respectively. The multi-multiplicand operand and multi-multiplier operand each include two mantissas, and each mantissa is denoted "1.zzz". The notation indicates a 4-bit value in which a leading bit 1 is inserted and zzz represents bit values of the mantissa, which are located after the binary point and are extracted by the operand formatter circuit 606. The mantissas in register 608 are indicated by blocks 612 and 614, and the mantissas in register 610 are indicated by dashed blocks 616 and 618. Bit values of 0 are inserted for padding between the mantissas to permit extraction of the products from the output of the multiplier circuit 620.

The multiplier circuit 620 is configured to multiply the multi-multiplicand operand in register 608 by the multi-multiplier operand in register 610 and store the resulting value in register 622. As the multi-multiplicand operand has two mantissas, and the multi-multiplier operand has two mantissas, the output from the multiplier circuit 620 includes four products, which can be termed "mantissa products." The weights can be denoted $w_i$, and the input activations can be denoted $x_i$. Mantissas of the weights can be denoted $w_i(m)$, and mantissas of the input activations can be denoted $x_i(m)$. The weight mantissas indicated by blocks 618 and 616 can be $w_1(m)$ and $w_2(m)$, respectively. The input activation mantissas indicated by blocks 614 and 612 can be $x_1(m)$ and $x_2(m)$, respectively. The multiplier circuit generates the following mantissa products:

$$w_1(m)*x_1(m)=mm.mmmmmmm$$

$$x_1(m)*w_2(m)=nn.nnnnnn$$

$$x_2(m)*w_1(m)=pp.pppppp$$

$$w_2(m)*x_2(m)=qq.qqqqqq$$

which are shown in the register 622. The binary point of each mantissa product follows the two most significant bits and is included for purposes of illustration.

Though four mantissa products are shown, it will be recognized that the products that are useful depend on the application. For example, fewer than all four products may be useful in some applications.

For each useful mantissa product, an instance of circuit 624 is provided to process the exponents of the floating point operands, perform accumulation, and restore the values of the shared exponents to the accumulated value. Thus, if four mantissa products are generated by the multiplier circuit 620 and all four mantissa products are useful in the application, four instances of circuit 624 are provided.

Each instance of circuit 624 includes an adder circuit 626 that inputs the exponents of the floating point operands associated with the mantissas from which the mantissa product was generated. Exponents of the floating point operands are denoted $w_i(e)$ and $x_j(e)$. Thus, for a mantissa product resulting from $w_i(m)*x_j(m)$, the exponents extracted by the operand formatting circuit 606 and input to the instance of the adder circuit are $w_i(e)$ and $x_j(e)$. The output (summed exponents) of the adder circuit 626 is input to the left shifter circuit 628, which left shifts one of the mantissa products provided by the register 622 by the number of bits indicated by the summed exponents. A bit value 0 is prepended to the output of the left shifter circuit as shown by concatenation circuit 630. The additional bit is the most significant bit in the value output from the concatenation circuit 630.

The operand formatter circuit 606 also routes the sign bits of the floating point operands associated with the mantissas from which the mantissa product was generated. Sign bits of the floating point operands are denoted $w_i(s)$ and $x_j(s)$. Thus, for a mantissa product resulting from $w_i(m)*x_j(m)$, the sign bits extracted by the operand formatting circuit 606 and input to the instance of the adder circuit are $w_i(s)$ and $x_j(s)$. The sign bits are input to the XOR circuit 632. The replication circuit 634 replicates the value of the one bit output by the XOR circuit 632 and outputs an n-bit value, where n is the bit width of the output of the concatenation circuit 630. The n-bit value from the replication circuit 634 and the n-bit value from the concatenation circuit are input to the XOR circuit 636, which outputs a fixed point representation of the floating point product of $w_i*x_j$.

The accumulator circuit 638 sums the output from the XOR circuit 636 with the value held in the accumulation register 640, and the bit output from XOR circuit 632 is input to the accumulator 638 as a carry-in bit. When the product of the sign bit is 0 (output of XOR circuit 632), the carry bit is 0 and XOR circuit 636 outputs a vector of zeros, and effectively the input to the accumulator is the same as output of concatenation circuit 630 and the accumulator circuit performs addition. When the product of the sign bits is 1 (output of XOR circuit 632), the accumulator circuit performs subtraction. XOR circuit 636 and the carry bit from XOR circuit 632 enable 2's complement subtraction by flipping the output of concatenation circuit 630 and providing the carry bit (+1) as input to the accumulator circuit. The accumulator circuit stores the result back in the accumulation register. Once all desired multiplications and accumulations are complete, the fixed point-to-floating point conversion circuit 642 converts the accumulated fixed point value result to a floating point value, which is stored in register 644.

Adder circuit 646 adds the shared exponent of the quantized weights to the shared exponent of the quantized input activations, and the resulting value is added to the exponent in register 644 by adder circuit 648. The restored exponent is stored in register 650, along with the sign bit and mantissa from the register 644.

Figure 7:
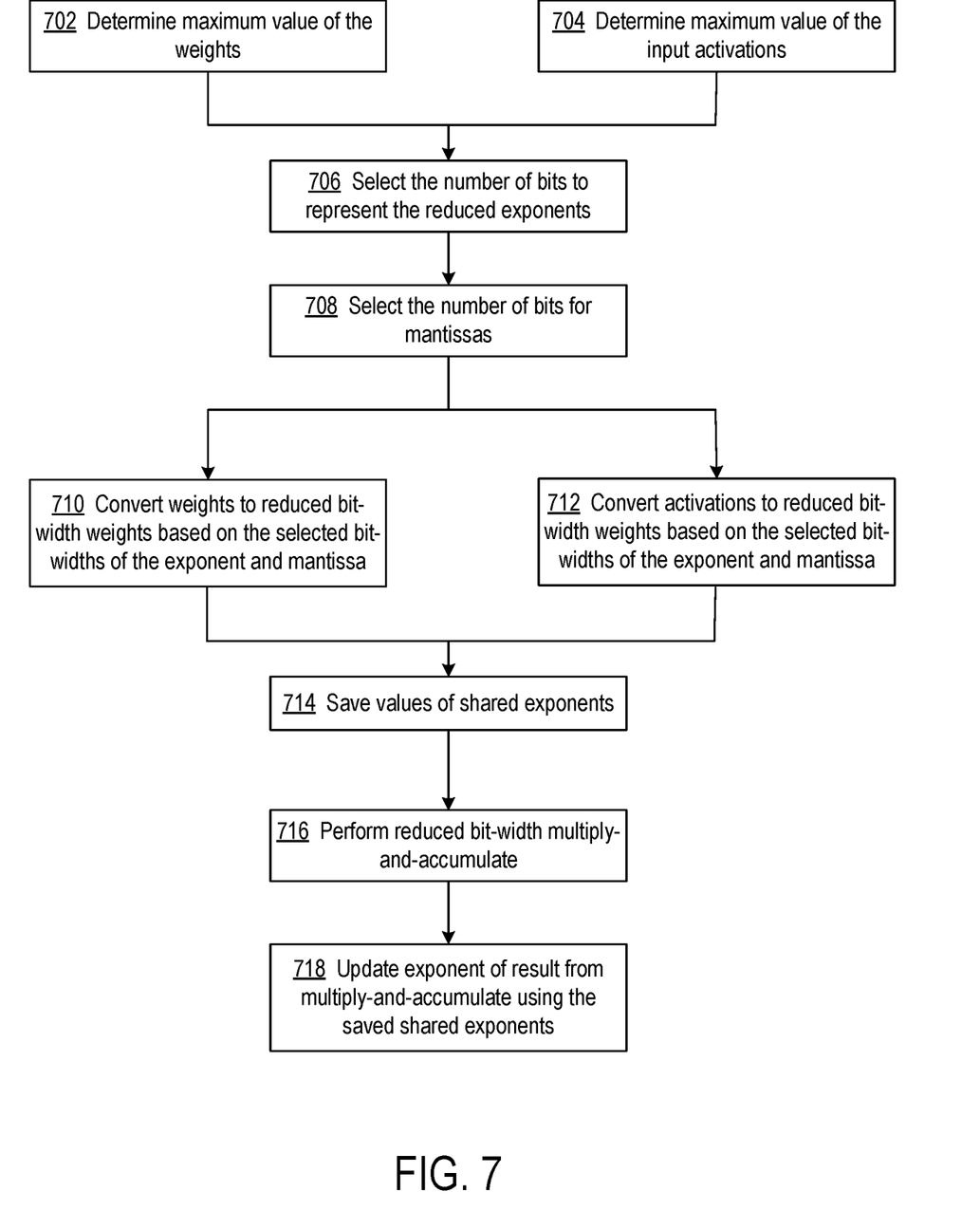
FIG. 7 shows a flowchart of a process of reducing bit-widths of operands by quantizing the operands, and performing multiply and accumulate operations by a MAC circuit.

FIG. 7 shows a flowchart of a process of reducing bit-widths of operands by quantizing the operands, and performing multiply and accumulate operations by a MAC circuit. Weights and input activations are the operands whose bit widths are reduced in the following discussion.

At block 702, the process determines the maximum absolute value, $w_{max}$, of a set of weights, such as the set of weights used in a layer of a neural network. The absolute value of $w_{max}$ will determine the greatest exponent (in base 2) that will be used in the numerical representation. At block 704, the process determines the maximum absolute value, $x_{max}$, of a set of input activations, such as the set of input activations used in a layer of a neural network. The maximum absolute value of the input activations can be found after registering the activations of a given layer using a small fraction of the training dataset or synthetic images as inputs, for example. The absolute value of $x_{max}$ will determine the greatest exponent (in base 2) that will be used in the numerical representation.

At block 706, the process selects a value for a, which is the number of bits that will be allocated for the exponent of each weight and input activation. The value of a determines the range of weights and input activations, and is anchored to the greatest exponent defined by $w_{max}$ and $x_{max}$. For example, if $w_{max}=-0.6$, the maximum exponent will be $-1$. Consequently, the greatest power of two that can be represented is $2^{-1}=0.5$. If $\alpha=2$, then $2^2=4$ different absolute values of powers of two can be represented by the quantized values: $2^{-4}$, $2^{-3}$, $2^{-2}$ and $2^{-1}$. Once the smallest exponent is known, the value can be used as the shared exponent for the layer. For each weight only the difference of the full exponent and the shared exponent needs to be encoded, and for each input activation only the difference of the full exponent and the shared exponent needs to be encoded.

At block 708, the process selects which is the number of bits used to represent the mantissas of the weights and input activations. The number of bits determines the scaling factors for each representable power of two. In other words, determines the precision of the quantized weights and input activations. For example, a mantissa of 2 bits will be able to represent the scaling factors 1, 1.25, 1.5, and 1.75. As in standard floating point representation, the scaling factor has the value of an implicit leading one plus the numerical value represented with the mantissa (which corresponds to an all-fractional unsigned fixed-point number).

Note that the values for a, and the shared exponent might be different for the weights than for the input activations.

The un-quantized weights and input activations are converted to the quantized values at block 710 and 712. The weights and input activations are mapped to the nearest values that are representable as quantized values. If the absolute value is slightly below the smallest non-zero absolute value representable, the value can be mapped to a value of zero (the specifics of this rule can be seen from studying the algorithm provided below). If a weight or input activation exceeds the maximum absolute value representable, the value can be mapped to that maximum value. Note that, in contrast to standard floating point representation, the disclosed quantization approach avoids the representation of many special cases, such as not-a-number, infinity, and sub-normal numbers. The only exception that is supported is the value 0, which can be represented in one of two ways: 1) as a special case that is represented when all the exponent and mantissa bits are zero, regardless of the sign bit, or 2) using an additional zero bit, which, in conjunction with variable length encoding, could be useful to compress sparse layers.

The procedure for converting the weights of a given layer is further described by the algorithm shown in EXAMPLE 1 below:

---

Inputs: $\alpha$, $\beta$, and $w_{max}$

Initialization: $n_1 := \left\lceil \log_2\left(\frac{2^{\beta+1}}{2^{\beta+2}-1}|w_{max}|\right)\right\rceil$, and $n_2 := n_1 + 1 - 2^{\alpha}$.

$t_{low} := \frac{2^{\beta+2}-1}{2^{\beta+2}} 2^{n_2}$.

Assign a value of zero to all the weights with an absolute value smaller than $t_{low}$.
for i = 0, 1, . . . , $n_1 - n_2$ do
  $\gamma = 2^{n_2+i}$
  for j = 0, 1, . . . , $2^{\beta} - 1$ do
    $t_{up} = t_{low} + \gamma 2^{-\beta}$.
    If j == 0, $t_{up} = t_{up} - \gamma 2^{-\beta-2}$
    Assign an absolute value of $\rho$ =
    $(1 + j * 2^{-beta}) * \gamma$ to all the weights with an absolute value between $t_{low}$ (inclusive) and $t_{up}$. Preserve the sign of the modified weights.
    $t_{low} = t_{up}$
Assign an absolute value of $\rho$ to all the weights with an absolute value greater or equal than $t_{up}$. Preserve the sign of the modified weights.

---

EXAMPLE 1

The algorithm of EXAMPLE 1 can be modified to convert the input activations by substituting $x_{max}$ for $w_{max}$.

At block 714, the shared exponent of the quantized weights and the shared exponent of the quantized input activations are stored so that the final value generated from multiplications and accumulations can be restored to the proper magnitude. At block 716, the MAC circuit performs multiply and accumulate operations using the quantized operands, and at block 718 the exponent of the result is updated, as shown and described by the circuits of FIGS. 2, 5, and 6, for example.

Figure 8:
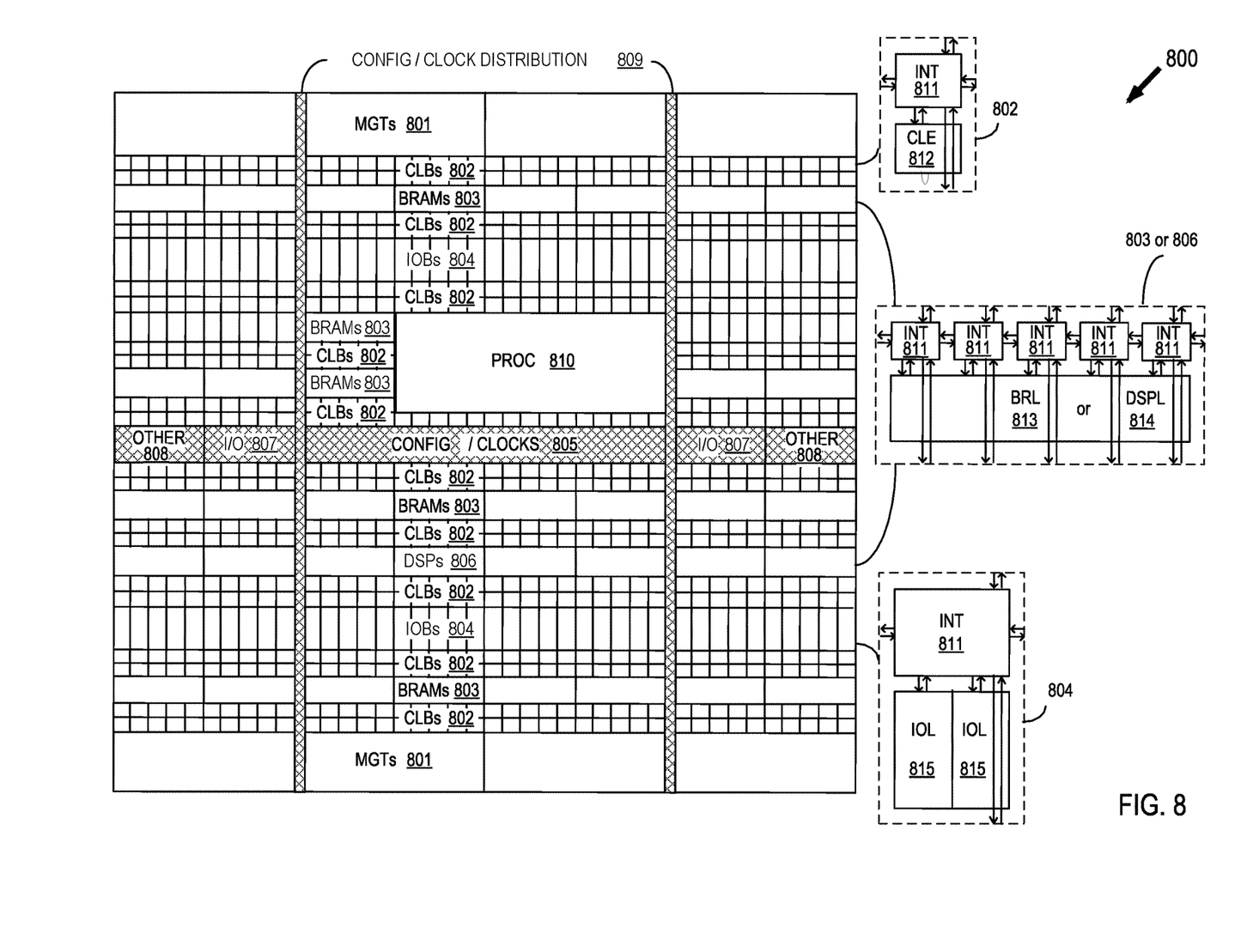
FIG. 8 shows a programmable integrated circuit (IC) on which the disclosed circuits and processes can be implemented.

FIG. 8 shows a programmable integrated circuit (IC) 800 on which the disclosed circuits and processes can be implemented. The programmable IC may also be referred to as a System On Chip (SOC) that includes field programmable gate array logic (FPGA) along with other programmable resources. FPGA logic may include several different types of programmable logic blocks in the array. For example, FIG. 8 illustrates programmable IC 800 that includes a large number of different programmable tiles including multi-gigabit transceivers (MGTs) 801, configurable logic blocks (CLBs) 802, random access memory blocks (BRAMs) 803, input/output blocks (IOBs) 804, configuration and clocking logic (CONFIG/CLOCKS) 805, digital signal processing blocks (DSPs) 806, specialized input/output blocks (I/O) 807, for example, clock ports, and other programmable logic 808 such as digital clock managers, analog-to-digital converters, system monitoring logic, and so forth. Some programmable IC having FPGA logic also include dedicated processor blocks (PROC) 810 and internal and external reconfiguration ports (not shown).

In some FPGA logic, each programmable tile includes a programmable interconnect element (INT) 811 having standardized connections to and from a corresponding interconnect element in each adjacent tile. Therefore, the programmable interconnect elements taken together implement the programmable interconnect structure for the illustrated FPGA logic. The programmable interconnect element INT 811 also includes the connections to and from the programmable logic element within the same tile, as shown by the examples included at the top of FIG. 8.

For example, a CLB 802 can include a configurable logic element CLE 812 that can be programmed to implement user logic, plus a single programmable interconnect element INT 811. A BRAM 803 can include a BRAM logic element (BRL) 813 in addition to one or more programmable interconnect elements. Typically, the number of interconnect elements included in a tile depends on the height of the tile. The illustrated BRAM tile has the same height as five CLBs, but other numbers (e.g., four) can also be used. A DSP tile 806 can include a DSP logic element (DSPL) 814 in addition to an appropriate number of programmable interconnect elements. An 10B 804 can include, for example, two instances of an input/output logic element (IOL) 815 in addition to one instance of the programmable interconnect element INT 811. As will be clear to those of skill in the art, the actual I/O bond pads connected, for example, to the I/O logic element 815, are manufactured using metal layered above the various illustrated logic blocks, and typically are not confined to the area of the input/output logic element 815.

A columnar area near the center of the die (shown shaded in FIG. 8) is used for configuration, clock, and other control logic. Horizontal areas 809 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 8 include additional logic blocks that disrupt the regular columnar structure making up a large part of the programmable IC. The additional logic blocks can be programmable blocks and/or dedicated logic. For example, the processor block PROC 810 shown in FIG. 8 spans several columns of CLBs and BRAMs.

Note that FIG. 8 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 8 are purely exemplary. For example, in an actual programmable IC, more than one adjacent column of CLBs is typically included wherever the CLBs appear, to facilitate the efficient implementation of user logic.

Though aspects and features may in some cases be described in individual figures, it will be appreciated that features from one figure can be combined with features of another figure even though the combination is not explicitly shown or explicitly described as a combination.

The circuits and methods are thought to be applicable to a variety of systems for performing multiply and accumulate operations. Other aspects and features will be apparent to those skilled in the art from consideration of the specification. The circuits and methods may be implemented as an application specific integrated circuit (ASIC) or as a logic on a programmable logic device. It is intended that the specification and drawings be considered as examples only, with a true scope of the invention being indicated by the following claims.

What is claimed is:

1. A circuit arrangement comprising:
an exponent adder circuit configured to sum a first exponent and a second exponent and generate an output exponent;
a mantissa multiplier circuit configured to multiply a first mantissa and a second mantissa and generate an output mantissa;
a first conversion circuit coupled to outputs of the exponent adder circuit and the mantissa multiplier circuit, the first conversion circuit configured to convert the output exponent and output mantissa into a fixed point number;
an accumulation register;
an accumulator circuit coupled to the conversion circuit and to the accumulation register, the accumulator circuit configured to sum contents of the accumulation register and the fixed point number into an accumulated value and store the accumulated value in the accumulation register;
a second conversion circuit configured to convert fixed point output from the accumulation register to a floating point output;
a shared exponent register configured for storage of a first shared exponent and a second shared exponent; and
an exponent restoration circuit configured to update an exponent of the floating point output to an expanded exponent based on the first shared exponent, the second shared exponent and the exponent of the floating point output.

2. The circuit arrangement of claim 1, further comprising:
a plurality of instances of the exponent adder circuit;
a plurality of instances of the mantissa multiplier circuit;
a plurality of instances of the first conversion circuit; and
wherein the accumulator circuit is coupled to the plurality of instances of the first conversion circuit and includes a single-instruction-multiple-data adder circuit configured to sum a first pair of operands from a first pair of the plurality of first conversion circuits in parallel with summing a second pair of operands from a second pair of the plurality of conversion circuits.

3. The circuit arrangement of claim 1, further comprising a neural network including an array of multiply-and-accumulate (MAC) circuits, wherein each MAC circuit includes respective instances of the exponent adder circuit, the mantissa multiplier circuit, the first conversion circuit, the accumulation register, and the accumulator circuit.

4. A circuit arrangement comprising:
an exponent adder circuit configured to sum a first exponent and a second exponent and generate an output exponent;
a mantissa multiplier circuit configured to multiply a first mantissa and a second mantissa and generate an output mantissa;
an accumulation register;
an accumulator circuit coupled to the exponent adder circuit, mantissa multiplier, and the accumulation register, the accumulator circuit configured to sum contents of the accumulation register and a floating point number represented by the output exponent and output mantissa into an accumulated value and store the accumulated value in the accumulation register;
first and second shared exponent registers configured for storage of a first shared exponent and a second shared exponent, respectively; and
an exponent restoration circuit configured to update an exponent of the accumulated value to an expanded exponent based on the first shared exponent, second shared exponent, and the exponent of the accumulated value.

5. The circuit arrangement of claim 4, further comprising:
an operand formatting circuit configured to combine two or more floating point multiplicands into a multi-multiplicand operand, and combine two or more floating point multipliers into a multi-multiplier operand;
wherein the mantissa multiplier circuit is configured to multiply the multi-multiplicand operand by the multi-multiplier operand and output a value having four or more mantissa products;
four or more instances of the exponent adder circuit, each instance configured to sum an exponent of one of the two or more floating point multiplicands and an exponent of one of the two or more floating point multipliers and generate an output exponent;
four or more instances of a first conversion circuit coupled to outputs of the instances of the exponent adder circuit, respectively, and to the instances of the mantissa multiplier circuit, respectively, each instance of the first conversion circuit configured to convert the output exponent and one of the mantissa products into a fixed point number;
four or more instances of the accumulation register;
four or more instances of the accumulator circuit, each instance configured to sum contents of one of the instances of the accumulator register and the fixed point number into an accumulated value and store the accumulated value in the one of the instances of the accumulation register;
four or more instances of a second conversion circuit, each instance of the second conversion circuit configured to convert fixed point output from one of the instances of the accumulation register to a floating point output; and
four or more instances of an exponent restoration circuit, each instance configured to update the exponent of the floating point output from one of the instances of the first conversion circuit to an expanded exponent based on the first shared exponent, the second shared exponent and an exponent of the floating point output.

6. The circuit arrangement of claim 5, wherein the first shared exponent is a shared exponent of the two or more floating point multiplicands.

7. The circuit arrangement of claim 6, wherein the second shared exponent is a shared exponent of the two or more floating point multipliers.

8. The circuit arrangement of claim 7, further comprising a shared exponent adder circuit configured to sum the first shared exponent and the second shared exponent.

9. The circuit arrangement of claim 4, further comprising a shared exponent adder circuit configured to sum the first shared exponent and the second shared exponent.

10. The circuit arrangement of claim 4, further comprising a neural network including an array of multiply-and-accumulate (MAC) circuits, wherein each MAC circuit includes respective instances of the exponent adder circuit, the mantissa multiplier circuit, the accumulation register, the accumulator circuit, first and second shared exponent registers, and exponent restoration circuit.

11. A method, comprising:
storing a first shared exponent and a second shared exponent in first and second shared exponent registers, respectively;
summing a first exponent and a second exponent and generating an output exponent;
multiplying a first mantissa and a second mantissa and generating an output mantissa;
summing contents of an accumulation register and a value based on the output exponent and output mantissa into an accumulated value;
storing the accumulated value in the accumulation register; and
updating an exponent of the accumulated value to an expanded exponent based on the first shared exponent, second shared exponent, and the exponent of the accumulated value.

12. The method of claim 11, further comprising:
combining by an operand formatting circuit, two or more floating point multiplicands into a multi-multiplicand operand;
combining by the operand formatting circuit, two or more floating point multipliers into a multi-multiplier operand;
wherein the multiplying includes multiplying the multi-multiplicand operand by the multi-multiplier operand and outputting a value having four or more mantissa products;
summing by each instance of four or more instances of an exponent adder circuit, an exponent of one of the two or more floating point multiplicands and an exponent of one of the two or more floating point multipliers, and generating an output exponent;
converting by each instance of four or more instances of a first conversion circuit the output exponent and one of the mantissa products into a fixed point number;
summing by four or more instances of an accumulator circuit, contents of one of four or more instances of an accumulator register and the fixed point number into an accumulated value and storing the accumulated value in the one of the instances of the accumulation register;
converting by four or more instances of a second conversion circuit, fixed point output from one of the instances of the accumulation register to a floating point output; and
updating by four or more instances of an exponent restoration circuit, the exponent of the floating point output from one of the instances of the second conversion circuit to an expanded exponent based on the first shared exponent, the second shared exponent and the exponent of the floating point output.

13. The method of claim 12, wherein the first shared exponent is a shared exponent of the two or more floating point multiplicands.

14. The method of claim 13, wherein the second shared exponent is a shared exponent of the two or more floating point multipliers.

15. The method of claim 14, further comprising summing the first shared exponent and the second shared exponent by a shared exponent adder circuit.

16. The method of claim 12, further comprising summing the first shared exponent and the second shared exponent by a shared exponent adder circuit.

17. The method of claim 16, further comprising summing by each instance of the exponent restoration circuit, the exponent of the floating point output and output of the shared exponent adder circuit.

18. The method of claim 11, further comprising:
converting the output exponent and output mantissa into a fixed point value by a first conversion circuit, wherein the fixed point value is the value based on the output exponent and output mantissa; and
converting by a second conversion circuit, a fixed point value from the accumulation register to a floating point value.

* * * * *